US009632992B2

(12) United States Patent
Zimmerman

(10) Patent No.: US 9,632,992 B2
(45) Date of Patent: Apr. 25, 2017

(54) TRANSCRIPTION EDITING

(75) Inventor: Roger S. Zimmerman, Wellesley, MA (US)

(73) Assignee: Nuance Communications, Inc., Burlington, MA (US)

(*) Notice: Subject to any disclaimer, the term of this patent is extended or adjusted under 35 U.S.C. 154(b) by 566 days.

(21) Appl. No.: 13/214,404

(22) Filed: Aug. 22, 2011

(65) Prior Publication Data

US 2011/0302489 A1 Dec. 8, 2011

Related U.S. Application Data

(60) Continuation of application No. 12/209,472, filed on Sep. 12, 2008, now Pat. No. 8,028,248, which is a division of application No. 11/004,756, filed on Dec. 3, 2004, now Pat. No. 7,836,412.

(51) Int. Cl.
*G06F 3/048* (2013.01)
*G06F 17/24* (2006.01)
*G06F 17/21* (2006.01)

(52) U.S. Cl.
CPC ............ *G06F 17/24* (2013.01); *G06F 17/211* (2013.01)

(58) Field of Classification Search
CPC . G10L 15/22; G06F 17/30746; G06F 3/0237; G06F 17/276; G06F 17/2785
USPC ............... 715/827; 345/172; 704/6, 251–257
See application file for complete search history.

(56) References Cited

U.S. PATENT DOCUMENTS

| | | | |
|---|---|---|---|
| 3,648,249 A | 3/1972 | Goldsberry | |
| 3,676,856 A | 7/1972 | Manly | |
| 3,929,216 A * | 12/1975 | Einbinder | 400/484 |
| 4,360,892 A * | 11/1982 | Endfield | 715/257 |
| 4,522,518 A * | 6/1985 | Schmidt | 400/486 |
| 4,637,797 A | 1/1987 | Whitney et al. | |
| 4,701,130 A | 10/1987 | Whitney et al. | |
| 4,891,786 A | 1/1990 | Goldwasser | |
| 5,146,439 A | 9/1992 | Jachmann et al. | |
| 5,297,041 A * | 3/1994 | Kushler et al. | 715/202 |
| 5,519,808 A | 5/1996 | Benton, Jr. et al. | |

(Continued)

FOREIGN PATENT DOCUMENTS

EP 1248183 A2 10/2002
WO WO 03/034404 A1 4/2003

OTHER PUBLICATIONS

Batty et al., "The Development of a Portable Read-Time Display of Voice Source Characteristics," IEEE, Euromicro Conference, 2000, pp. 419-422.

(Continued)

*Primary Examiner* — Eric Wiener
(74) *Attorney, Agent, or Firm* — Wolf, Greenfield & Sacks, P.C.

(57) ABSTRACT

A computer program product for use with text transcribed from audio information, the computer program product residing on a computer-readable medium, includes computer-readable instructions for causing a computer to: enable defined keystroke combinations for use in editing the text transcribed from audio, the defined keystroke combinations corresponding to formatting functions identified as frequently-used functions during editing of a transcribed text; and respond to an activated keystroke combination by replacing a first format in the text document with a second format corresponding to the chosen keystroke combination.

18 Claims, 11 Drawing Sheets

(56) References Cited

U.S. PATENT DOCUMENTS

| | | |
|---|---|---|
| 5,602,982 A | 2/1997 | Judd et al. |
| 5,664,896 A | 9/1997 | Blumberg |
| 5,748,177 A * | 5/1998 | Baker et al. ............... 345/172 |
| 5,748,888 A | 5/1998 | Angelo et al. |
| 5,812,882 A | 9/1998 | Raji et al. |
| 5,857,212 A | 1/1999 | Van De Vanter |
| 5,875,429 A | 2/1999 | Douglas |
| 5,875,448 A | 2/1999 | Boys et al. |
| 5,911,485 A | 6/1999 | Rossmann |
| 5,953,541 A * | 9/1999 | King et al. ............... 710/67 |
| 5,960,447 A | 9/1999 | Holt et al. |
| 6,011,554 A * | 1/2000 | King et al. ............... 715/811 |
| 6,055,495 A | 4/2000 | Tucker et al. |
| 6,057,845 A * | 5/2000 | Dupouy ............... 715/863 |
| 6,064,965 A | 5/2000 | Hanson |
| 6,067,514 A | 5/2000 | Chen |
| 6,076,059 A | 6/2000 | Glickman et al. |
| 6,122,614 A | 9/2000 | Kahn et al. |
| 6,141,011 A | 10/2000 | Bodnar et al. |
| 6,184,803 B1 * | 2/2001 | Burrell, IV ............... 341/22 |
| 6,195,637 B1 | 2/2001 | Ballard et al. |
| 6,232,956 B1 * | 5/2001 | Mailman ............... 345/156 |
| 6,307,548 B1 | 10/2001 | Flinchem et al. |
| 6,338,038 B1 | 1/2002 | Hanson |
| 6,360,237 B1 | 3/2002 | Schulz et al. |
| 6,374,225 B1 | 4/2002 | Hejna, Jr. |
| 6,396,482 B1 | 5/2002 | Griffin et al. |
| 6,415,256 B1 | 7/2002 | Ditzik |
| 6,434,523 B1 | 8/2002 | Monaco |
| 6,438,545 B1 | 8/2002 | Beauregard et al. |
| 6,457,031 B1 | 9/2002 | Hanson |
| 6,542,091 B1 | 4/2003 | Rasanen |
| 6,611,802 B2 | 8/2003 | Lewis et al. |
| 6,718,303 B2 | 4/2004 | Tang et al. |
| 6,760,700 B2 | 7/2004 | Lewis et al. |
| 6,763,320 B2 | 7/2004 | Kimble |
| 6,792,409 B2 | 9/2004 | Wutte |
| 6,802,041 B1 | 10/2004 | Rehm |
| 6,865,258 B1 | 3/2005 | Polcyn |
| 6,912,498 B2 | 6/2005 | Stevens et al. |
| 6,950,994 B2 | 9/2005 | Dharap |
| 6,961,699 B1 | 11/2005 | Kahn et al. |
| 6,986,106 B2 | 1/2006 | Soin et al. |
| 6,993,246 B1 | 1/2006 | Pan et al. |
| 6,996,445 B1 | 2/2006 | Kamijo |
| 7,016,844 B2 | 3/2006 | Othmer et al. |
| RE39,090 E | 5/2006 | Beauregard et al. |
| 7,064,746 B2 | 6/2006 | Wen et al. |
| 7,088,341 B2 | 8/2006 | Koch et al. |
| 7,137,076 B2 | 11/2006 | Iwema et al. |
| 7,149,680 B2 | 12/2006 | Storisteanu et al. |
| 7,196,691 B1 | 3/2007 | Zweig |
| 7,206,938 B2 | 4/2007 | Bender et al. |
| 7,236,931 B2 | 6/2007 | He et al. |
| 7,236,932 B1 | 6/2007 | Grajski |
| 7,260,529 B1 | 8/2007 | Lengen |
| 7,292,975 B2 | 11/2007 | Lovance et al. |
| 7,382,359 B2 | 6/2008 | Griffin |
| 7,453,439 B1 * | 11/2008 | Kushler et al. ............... 345/168 |
| 7,508,324 B2 | 3/2009 | Suraqui |
| 7,515,903 B1 | 4/2009 | Cast |
| 7,580,838 B2 | 8/2009 | Divay et al. |
| 7,610,562 B2 | 10/2009 | Rockey et al. |
| 7,626,574 B2 * | 12/2009 | Kim ............... 345/168 |
| 7,712,053 B2 * | 5/2010 | Bradford et al. ............... 715/864 |
| 8,498,406 B2 * | 7/2013 | Ghassabian ............... 379/368 |
| 2002/0002459 A1 | 1/2002 | Lewis et al. |
| 2002/0013707 A1 | 1/2002 | Shaw et al. |
| 2002/0013709 A1 | 1/2002 | Ortega et al. |
| 2002/0049588 A1 | 4/2002 | Bennett et al. |
| 2002/0065653 A1 | 5/2002 | Kriechbaum et al. |
| 2002/0115476 A1 | 8/2002 | Padawer et al. |
| 2002/0143534 A1 | 10/2002 | Hol |
| 2002/0143544 A1 | 10/2002 | Gschwendtner |
| 2003/0004724 A1 | 1/2003 | Kahn et al. |
| 2003/0007018 A1 | 1/2003 | Seni et al. |
| 2003/0046080 A1 | 3/2003 | Hejna, Jr. |
| 2003/0067495 A1 | 4/2003 | Pu et al. |
| 2003/0083885 A1 | 5/2003 | Frimpong-Ansah |
| 2003/0190181 A1 * | 10/2003 | Kim ............... 400/472 |
| 2004/0021691 A1 * | 2/2004 | Dostie et al. ............... 345/773 |
| 2004/0029092 A1 | 2/2004 | Orr et al. |
| 2004/0056844 A1 * | 3/2004 | Gutowitz et al. ............... 345/168 |
| 2004/0093220 A1 | 5/2004 | Kirby et al. |
| 2004/0138881 A1 | 7/2004 | Divay et al. |
| 2004/0243760 A1 | 12/2004 | Dahman et al. |
| 2005/0055332 A1 | 3/2005 | Vasey |
| 2005/0149747 A1 | 7/2005 | Wesinger, Jr. et al. |
| 2005/0154999 A1 | 7/2005 | Wugoski |
| 2005/0212767 A1 * | 9/2005 | Marvit et al. ............... 345/158 |
| 2006/0010398 A1 * | 1/2006 | Griffin ............... 715/811 |
| 2006/0176283 A1 | 8/2006 | Suraqui |
| 2006/0206943 A1 | 9/2006 | Ellison et al. |
| 2006/0253895 A1 | 11/2006 | Brandofino et al. |
| 2006/0272025 A1 | 11/2006 | Mononen |
| 2007/0143857 A1 | 6/2007 | Ansari |
| 2007/0265845 A1 | 11/2007 | Bennett et al. |
| 2007/0283444 A1 | 12/2007 | Jang |
| 2007/0294745 A1 | 12/2007 | Tan et al. |
| 2007/0300287 A1 | 12/2007 | Wynne et al. |
| 2008/0034218 A1 | 2/2008 | Bender |

OTHER PUBLICATIONS

International Search Report for International Application No. PCT/IB02/01062 mailed Jun. 27, 2002.

"List of keyboard shortcuts for Word 2002, Word 2003, and Word 2007;" Microsoft Support; http://support.microsoft.com/kb/290938; May 7, 2007.

"WD98: Character Formatting Keyboard Commands in MacWord;" Microsoft Support; http://support.microsoft.com/kb/177184/en-us; Jul. 13, 2007.

"Word Juggler," Creative Computing, vol. 9, No. 6, p. 43; Jun. 1983; retrieved from: http://www.atarimagazines/com/creative/v9n6/43_Word_juggler.php.

"Macro (computer science)," Wikipedia, Feb. 9, 2009, http://en.wikipedia.org/wiki/Macro_(computer_science).

* cited by examiner

TRANSCRIPTION EDITING

RELATED APPLICATIONS

This application is a continuation under 35 U.S.C. §120 of U.S. Ser. No. 12/209,472, filed Sep. 12, 2008, now U.S. Pat. No. 8,028,248, which is a divisional under 35 U.S.C. §120 of U.S. Ser. No. 11/004,756, filed Dec. 3, 2004, now U.S. Pat. No. 7,836,412, both of which are incorporated herein by reference.

FIELD OF THE INVENTION

The invention relates to shortcut keystroke combinations used during editing of a transcribed document and further to the monitoring of use of shortcut keystroke combinations used during editing.

BACKGROUND OF THE INVENTION

Healthcare costs in the United States account for a significant share of the GNP. The affordability of healthcare is of great concern to many Americans. Technological innovations offer an important leverage to reduce healthcare costs.

Many Healthcare institutions require doctors to keep accurate and detailed records concerning diagnosis and treatment of patients. Motivation for keeping such records include government regulations (such as Medicare and Medicaid regulations), desire for the best outcome for the patient, and mitigation of liability. The records include patient notes that reflect information that a doctor or other person adds to a patient record after a given diagnosis, patient interaction, lab test or the like.

Record keeping can be a time-consuming task, and the physician's time is valuable. The time required for a physician to hand-write or type patient notes can represent a significant expense. Verbal dictation of patient notes offers significant timesavings to physicians, and is becoming increasingly prevalent in modern healthcare organizations.

Over time, a significant industry has evolved around the transcription of medical dictation. Several companies produce special-purpose voice mailbox systems for storing medical dictation. These centralized systems hold voice mailboxes for a large number of physicians, each of whom can access a voice mailbox by dialing a phone number and putting in his or her identification code. These dictation voice mailbox systems are typically purchased or shared by healthcare institutions. Prices can be over $100,000 per voice mailbox system. Even at these prices, these centralized systems save healthcare institutions vast sums of money over the cost of maintaining records in a more distributed fashion.

Using today's voice mailbox medical dictation systems, when a doctor completes an interaction with a patient, the doctor calls a dictation voice mailbox, and dictates the records of the interaction with the patient. The voice mailbox is later accessed by a medical transcriptionist who listens to the audio and transcribes the audio into a text record. The playback of the audio data from the voice mailbox may be controlled by the transcriptionist through a set of foot pedals that mimic the action of the "forward", "play", and "rewind" buttons on a tape player. Should a transcriptionist hear an unfamiliar word, the standard practice is to stop the audio playback and look up the word in a printed dictionary.

Some medical transcriptionists may specialize in one area of medicine, or may deal primarily with a specific group of doctors. The level of familiarity with the doctors' voices and with the subject matter can increase the transcriptionist accuracy and efficiency over time.

The medical transcriptionist's time is less costly for the hospital than the doctor's time, and the medical transcriptionist is typically much more familiar with the computerized record-keeping systems than the doctor is, so this system offers a significant overall cost saving to the hospital.

To reduce costs further, health care organizations are deploying speech recognition technology, such as the AutoScript™ product (made by eScription™ of Needham, Mass.), to automatically transcribe medical dictations. Automatically transcribed medical records documents usually require editing by the transcriptionist. This is especially true with respect to the formatting of medical records documents. Whereas speech recognition may accurately capture the literal word string spoken by the provider, the resulting document is generally not presented in an acceptable format. Examples of formatting which may need correction are punctuation, section headings and enumerated lists. While some speakers may dictate instructions which can assist in providing formatting, many will not, especially in the context of background speech recognition where most providers may not even know that the technology is being used to create the draft transcription.

Some healthcare institutions have specific formatting requirements that are difficult to accommodate automatically. Speakers may not be aware of the requirements, and therefore fail to provide verbal directives to assist in formatting, which is therefore prone to include errors. For example, some institutions require that physical examination sections of medical reports be divided into sub-sections, such as the following:

PHYSICAL EXAMINATION:
VITAL SIGNS: BP 120/80, pulse 75, temperature 99.1.
LUNGS: Clear to A&P.
HEART: Regular rate and rhythm. S1, S2 normal.
EXTREMITIES: Without edema.

Further, formatting corrections often involve substantially complex manipulation of existing text, such as insertions of line-feeds and punctuation marks, capitalization and cursor movement to correct a "single" error. For example, to turn a particular sentence into an enumerated list item, a transcriptionist inserts a line-feed, inserts the number '1', inserts a period '.', and inserts a space.

Another class of verbalizations that is especially prone to automatic speech recognition errors are proper names, particularly those of medical providers that do not practice at the same institution as the speaker. Within-institution providers often dictate "contact names" as the referring providers, or to whom copies of the medical record should be sent. Since there is a large diversity of such proper names, and many are very rare, these words are especially susceptible to speech recognition errors.

SUMMARY OF THE INVENTION

In general, in an aspect, the invention provides a computer program product for use with text transcribed from audio information, the computer program product residing on a computer-readable medium and comprising computer-readable instructions for causing a computer to: enable defined keystroke combinations for use in editing the text transcribed from audio, the defined keystroke combinations corresponding to formatting functions identified as frequently-used functions during editing of a transcribed text; and respond to an activated keystroke combination by replacing a first format in the text document with a second format corresponding to the chosen keystroke combination.

Implementations of the invention may include one or more of the following features. Activation of one of the defined keystroke combinations causes the computer to form a new sentence by inserting a period at the end of a selected word, adding a space and capitalizing the first letter of a word immediately after the selected word. Activation of one of the defined keystroke combination causes the computer to remove a sentence structure by removing a selected period, removing extra space and adjusting capitalization of words after the removed period. Activation of one of the defined keystroke combinations causes the computer to insert a comma after a selected word and cause the cursor to jump to the end of a next word. Activation of one of the defined keystroke combinations causes the computer to remove a comma and move the cursor to the end of a word immediately after the comma.

Implementations of the invention may also include one or more of the following features. Activation of one of the defined keystroke combinations causes the computer to produce a new enumerated list item. Activation of one of the defined keystroke combinations causes the computer to remove an enumerated list item. Activation of one of the defined keystroke combinations causes the computer to modify a sequence of words to appear as a single multi-word heading. Activation of one of the defined keystroke combinations causes the computer to remove a multi-word heading and alter the text to appear as plain text. Activation of one of the defined keystroke combinations causes the computer to present a menu of available text entries, wherein selection of one of the text entries causes the computer to insert text associated with the selected entry and delete a former entry, if any. The menu of available entries includes at least one of section headings and contact names.

In general, in another aspect, the invention provides a computer program product residing on a computer-readable medium and comprising computer-readable, computer-executable instructions for causing a computer to: monitor the use of a keystroke combination shortcut in editing a text transcribed from an audio recording recorded by a first speaker and edited by a first listener; count a number of times the keystroke combination is used during editing of the transcribed text; and determine a first productivity indicator based on the number of times the keystroke combination was used during editing and a number of times the keystroke combination could have been used during editing.

Implementations of the invention may include one or more of the following features. The first productivity indicator is a ratio of the number of times the keystroke combination is used during editing of the transcribed text and the number of times the keystroke combination could have been used during editing. The computer program product further comprises instructions for causing the computer to monitor keystroke combinations used in editing a plurality of texts, each of the plurality of texts transcribed from one of a plurality of audio recordings, wherein the instructions to determine the first productivity indicator comprise instructions to determine a productivity report for the plurality of texts. The computer program product further comprises instructions to report the first productivity indicator. The computer program product further comprises instructions to compare the number of times the keystroke combination is used during editing of the transcribed text with a count of lines of edited text per hour of editing to determine a second productivity indicator. The computer program product further comprises instructions for causing the computer to store an indication of the keystroke combinations as part of a history such that the computer program product can learn from historical keystroke combinations and adapt future keystroke combinations based on the historical keystroke combinations.

In general, in another aspect, the invention provides a method of determining use of keystroke combinations in an editing function of a transcribed document, the method including analyzing keystroke usage for at least one predefined shortcut keystroke combination employed during editing of a first transcribed text document, the first text document being edited by a document editor, the shortcut keystroke combination representing an editing function that, without the shortcut keystroke combination, would involve more keystrokes than in the shortcut keystroke combination to achieve, determining from the keystroke usage in the first document a productivity indicator indicative of effective use of the shortcut keystroke combination by the document editor, and informing the document editor of the productivity indicator to improve editing efficiency of the document editor in the editing of a second text document.

Implementations of the invention may include one or more of the following features. The method further comprises storing a record of the keystroke usage in a database. The productivity indicator is a productivity ratio and determining the productivity ratio includes comparing a count of actual usage of the keystroke combination and a number of times the keystroke combination could have been used during editing.

Various aspects of the invention may provide one or more of the following capabilities. Transcriptionists can be encouraged and assisted in editing documents more quickly. Transcription review times, and corresponding cost, can be reduced. Keystroke combinations can be added to improve the editing time for each transcriptionist, and reduce the number of keys/steps required in editing. Transcriptionist fatigue can be reduced. Consistency in the appearance of medical records documents can be increased. Editing productivity can be increased. The accuracy of medical transcription documents can be improved. The expediency and turn-around time of medical transcriptions can be improved. Stress on medical transcriptionists can be reduced.

These and other capabilities of the invention, along with the invention itself, will be more fully understood after a review of the following figures, detailed description, and claims.

DETAILED DESCRIPTION OF PREFERRED EMBODIMENTS

Embodiments of the invention provide keystroke combination shortcuts (referred to herein as "e-shortcuts") in a system for editing text documents, that have been transcribed from speech. Analysis of editing activity on a standard keyboard can reveal keystroke sequences that are repeated by a transcriptionist from document to document. Repetitive keystroke sequences can be incorporated into new e-shortcuts for the transcriptionist. E-shortcuts can be configured for implementation using an existing keyboard or can be accounted for in the manufacture of a keyboard specific to transcription editing. Other embodiments are within the scope of the invention.

Figure 1:
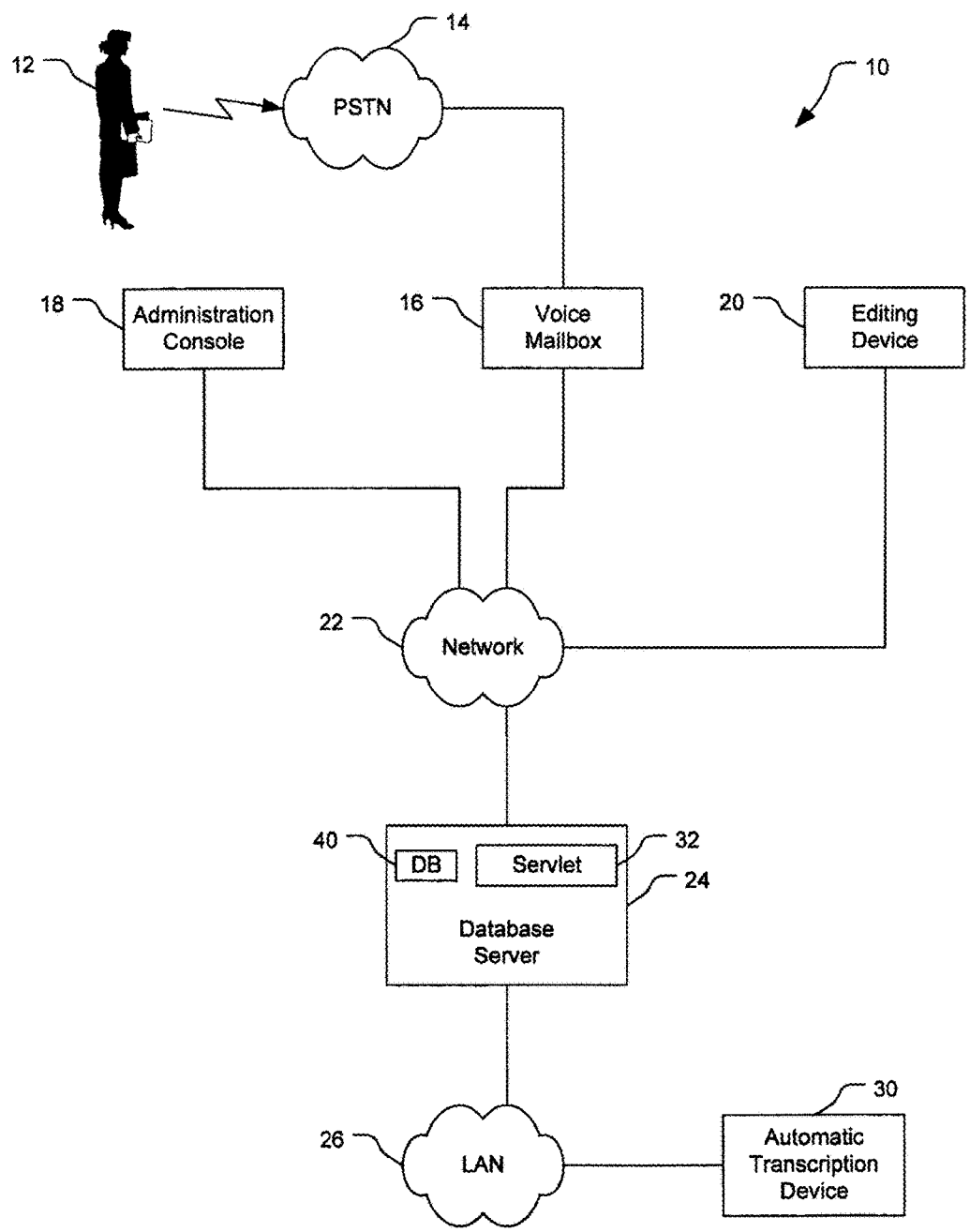
FIG. 1 is a simplified diagram of a system for transcribing dictations and editing corresponding transcriptions.

Referring to FIG. 1, a system 10 for transcribing audio and editing transcribed audio includes a speaker/person 12, a communications network 14, a voice mailbox system 16, an administrative console 18, an editing device 20, a communications network 22, a database server 24, a communications network 26 and an automatic transcription device 30. Here, the network 14 is preferably a public switched telephone network (PSTN) although other networks, including packet-switched networks could be used, e.g., if the speaker 12 uses an Internet phone for dictation. The network 22 is preferably a packet-switched network such as the global packet-switched network known as the Internet. The network 26 is preferably a packet-switched, local area network (LAN). Other types of networks may be used, however, for the networks 14, 22, 26, or any or all of the networks 14, 22, 26 may be eliminated, e.g., if items shown in FIG. 1 are combined or eliminated.

Preferably, the voice mailbox system 16, the administrative console 18, and the editing device 20 are situated "off site" from the database server 24 and the automatic transcription device 30. These systems/devices 16, 18, 20, however, could be located "on site," and communications between them may take place, e.g., over a local area network. Similarly, it is possible to locate the automatic transcription device 30 off-site, and have the device 30 communicate with the database server 24 over the network 22.

The network 14 is configured to convey dictation from the speaker 12 to the voice mailbox system 16. Preferably, the speaker 12 dictates into an audio transducer such as a telephone, and the transduced audio is transmitted over the telephone network 14 into the voice mailbox system 16, such as the Intelliscript™ product made by eScription™ of Needham, Mass. The speaker 12 may, however, use means other than a standard telephone for creating the digital audio file for each dictation. For example, the speaker 12 may dictate into a handheld PDA device that includes its own digitization mechanism for storing the audio file. Or, the speaker 12 may use a standard "dictation station," such as those provided by many vendors. Still other devices may be used by the speaker 12 for dictating, and possibly digitizing the dictation, and sending it to the voice mailbox system 16.

The voice mailbox system 16 is configured to digitize audio from the speaker 12 to produce a digital audio file of the dictation. For example, the system 16 may use the Intelliscript™ product made by eScription.

The voice mailbox system 16 is further configured to prompt the speaker 12 to enter an identification code and a worktype code. The speaker 12 can enter the codes, e.g., by pressing buttons on a telephone to send DTMF tones, or by speaking the codes into the telephone. The system 16 may provide speech recognition to convert the spoken codes into a digital identification code and a digital worktype code. The mailbox system 16 is further configured to store the identifying code and the worktype code in association with the dictation. The system 16 preferably prompts the speaker 12 to provide the worktype code at least for each dictation related to the medical field. The worktype code designates a category of work to which the dictation pertains, e.g., for medical applications this could include Office Note, Consultation, Operative Note, Discharge Summary, Radiology report, etc. The worktype code may be used to refine settings, such that settings may be specific not only to speaker-transcriptionist pairings, but further to worktype of dictations provided by the speaker, and/or to other parameters or indicia.

The voice mailbox system 16 is further configured to transmit the digital audio file and speaker identification code over the network 22 to the database server 24 for storage. This transmission is accomplished by the system 16 product using standard network transmission protocols communicating with the database server 24.

The database server 24 is configured to store the incoming data from the voice mailbox system 16, as well as from other sources. The database server 24 may include the SpeechBase™ database product from eScription. Software of the database server is configured to produce a database record for the dictation, including a file pointer to the digital audio data, and a field containing the identification code for the speaker 12. If the audio and identifying data are stored on a PDA, the PDA may be connected to a computer running the HandiScript™ software product made by eScription that will perform the data transfer and communication with the database server 24 to enable a database record to be produced for the dictation.

Preferably, all communication with the database server 24 is intermediated by a "servlet" application 32 that includes an in-memory cached representation of recent database entries. The servlet 32 is configured to service requests from the voice mailbox system 16, the automatic transcription device, the editing device 20, and the administrative console 18, reading from the database when the servlet's cache does not contain the required information. The servlet 32 includes a separate software module that helps ensure that the servlet's cache is synchronized with the contents of the database. This helps allow the database to be off-loaded of much of the real-time data-communication and to grow to be much larger than otherwise possible. For simplicity, however, the below discussion does not refer to the servlet, but all database access activities may be realized using the servlet application 32 as an intermediary.

The automatic transcription device 30 may access the database in the database server 24 over the data network 26 for transcribing the stored dictation. The automatic transcription device 30 uses an automatic speech recognition (ASR) device (e.g., software) to produce a draft transcription for the dictation. An example of ASR technology is the AutoScript™ product made by eScription, that also uses the speaker identifying information to access speaker-dependent ASR models with which to perform the transcription. The device 30 transmits the draft transcription over the data network 26 to the database server 24 for storage in the database and to be accessed, along with the digital audio file, by the editing device 20.

The editing device 20 is configured to be used by a transcriptionist to access and edit the draft transcription stored in the database of the database server 24. The editing device 20 includes a computer (e.g., display, keyboard, mouse, monitor, memory, and a processor, etc.), an attached foot-pedal, and appropriate software such as the EditScript™ software product made by eScription. The transcriptionist can request a dictation job by, e.g., clicking an on-screen icon. The request is serviced by the database server 24, which finds the dictation for the transcriptionist, and transmits the corresponding audio file and the draft transcription text file, as stored in the database.

The transcriptionist edits the draft using the editing device 20, which includes the editing shortcuts discussed below, and sends the edited transcript back to the database server 24. For example, to end the editing session the transcriptionist can click an on-screen icon button to instruct the editing device 20 to send the final edited document to the database server 24 via the network 22, along with a unique identifier for the transcriptionist.

The editing device 20 also sends the database server 24 a count of the e-shortcut keys used by the transcriptionist during the editing session. The database server 24 can stores the begin-time and the end-time of the editing session for each dictation, and indicia of the inherent length of the dictation (e.g. total audio duration, number of lines of transcribed text in the edited document, etc.). One or more measures of productivity may be calculated based on the e-shortcut use count and document data, and possibilities for which this information is useful are described in detail below.

With the data sent from the editing device 20, the database in the server 24 contains, for each dictation: a speaker identifier, a transcriptionist identifier, a file pointer to the digital audio signal, and a file pointer to the edited text document, a shortcut key count, and the length of the dictation.

The edited text document can be transmitted directly to a customer's medical record system or accessed over the data network 22 from the database by the administrative console 18. The console 18 may include an administrative console software product such as Emon™ made by eScription.

Figure 2:
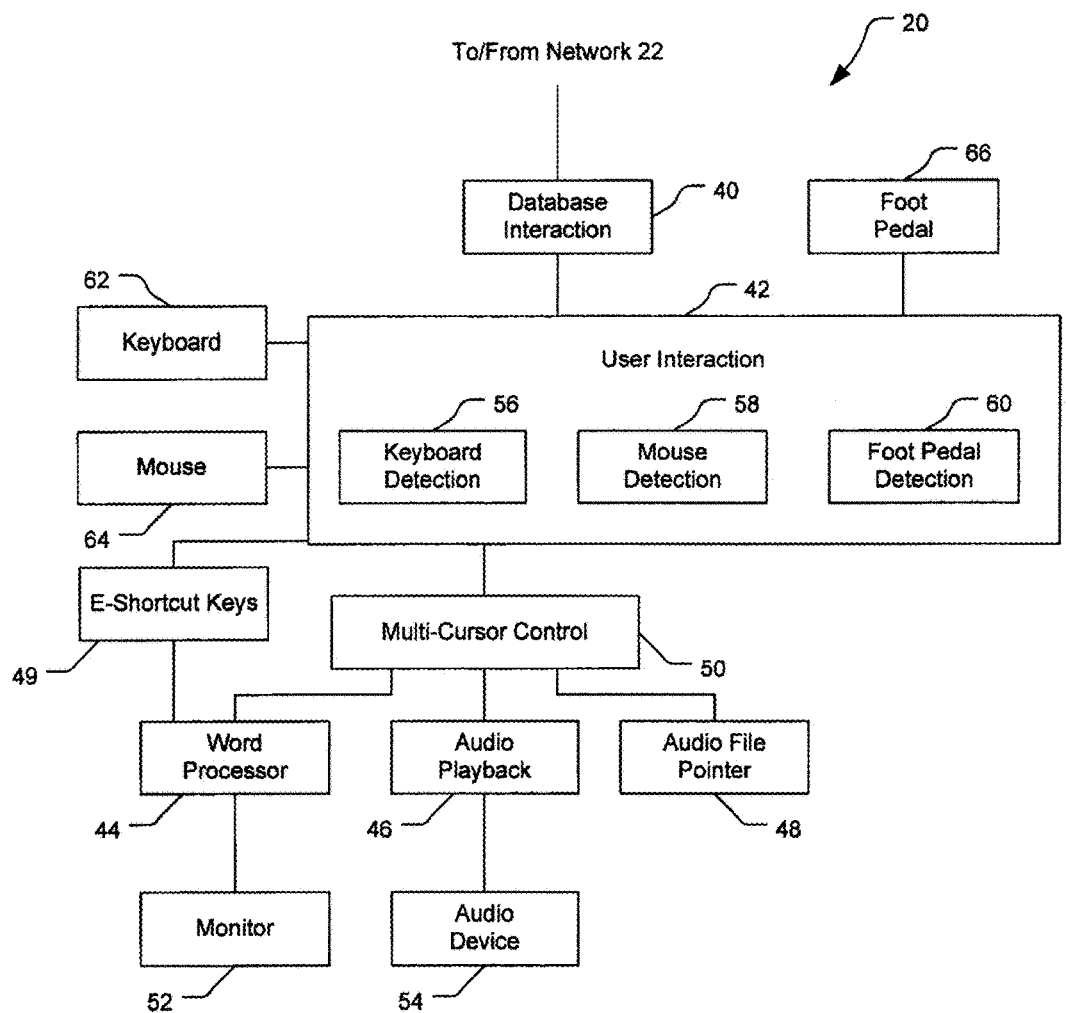
FIG. 2 is a simplified block diagram of an editing device of the system shown in FIG. 1.

Referring to FIG. 2, components of the editing device 20, e.g., a computer, include a database interaction module 41, a user interface 42, a word processor module 44, an audio playback module 46, an audio file pointer 48, an e-shortcut key module 49, a multi-cursor control 50, a monitor 52, and an audio device 54. The monitor 52 and audio device 54, e.g., speakers, are physical components while the other components shown in FIG. 2 are functional components that may be implemented with software, hardware, etc., or combinations thereof. The audio playback device 46, such as a SoundBlaster® card, is attached to the audio output transducer 54 such as speakers or headphones. The database interaction, audio playback, and editing of the draft transcription is accomplished by means of the appropriate software such as the EditScript™ software product made by eScription. The editing software is loaded on the editing device computer 20 and configured appropriately for interaction with other components of the editing device 20. The editing software can use a standard word processing software library, such as that provided with Microsoft Word®, in order to load, edit and save documents corresponding to each dictation.

The editing software includes the database interaction module 41, the user interface module 42, the word processing module 44, the audio playback module 46, the audio file pointer adjustment module 48, the e-shortcut key module 49 and the cursor control 50. The user interface module 42 controls the activity of the other modules and includes keyboard detection 56, mouse detection 58, and foot pedal detection 60 sub-modules for processing input from a keyboard 62, a mouse 64, and a foot-pedal 66. The foot pedal 66 is a standard transcription foot pedal and is connected to the editing device computer through the computer's serial port. The foot pedal 66 preferably includes a "fast forward" portion and a "rewind" portion.

The transcriptionist can request a job from the database by selecting an on-screen icon with the mouse 64. The user interface module 42 interprets this mouse click and invokes the database interaction module 41 to request the next job from the database. The database server 24 (FIG. 1) responds by transmitting the audio data file, the draft transcription file and the enabled e-shortcuts to the database interaction module 41. With this information, the editing software can initialize a word-processing session by loading the draft text into the word processing module 44.

While the transcriptionist is editing the document, the user interface module 42 can service hardware interrupts from all three of its sub-modules 56, 58, 60. Most standard key presses, shortcut key presses and on-document mouse-clicks are sent to the word processing module 44 to perform the document editing functions indicated and to update the monitor display. Some user interaction, however, may be directed to the audio-playback oriented modules 46, 48, e.g., audio position control, and/or volume control. The transcriptionist may indicate that editing is complete by clicking another icon. In response to such an indication, the final text file and an e-shortcut count based on the shortcut keys used by the transcriptionist are sent through the database interaction module 41 to the database server 24.

The transcriptionist can use the foot pedal 66 to indicate that the audio should be "rewound," or "fast-forwarded" to a different time point in the dictation. These foot-pedal presses are serviced as hardware interrupts by the user interaction module 42. Movement to a different part of the audio is implemented by the audio file pointer module 48 by incrementing or decrementing a pointer into the digital audio file. Hot keys and mouse clicks may also be used to adjust the audio file pointer.

As the audio plays, the transcriptionist uses the cursor to move to different locations within the text document that correspond to the audio. Throughout editing, the transcriptionist presses designated keys on the computer keyboard 62 to perform the editing function shortcuts. The e-shortcuts are formatted keys or combinations of keys that actuate designated functions. The designated functions can be formatting changes that are performed throughout the edit of the document.

Actuation of the e-shortcut keys is regulated by the e-shortcut module 49. The e-shortcut module 49 includes a list of e-shortcuts and corresponding actions. Actions may be formatting lines, adding or removing punctuation, sentence structure alterations, inserting headings or removing headings, inserting contact names, correcting spacing, etc. The module 49 is configured to perform editing functions in the text document according to the e-shortcut key sequence that is actuated. The list of e-shortcuts in the module 49 preferably include key sequences to alter formatting in the document that frequently requires attention from the transcriptionist, so that a transcriptionist can quickly, yet accurately edit a transcription. The e-shortcuts preferably correspond to format changes that transcriptionists frequently make while editing transcriptions. The format changes thus correspond to format styles that are often or repeatedly desired but for which instructions are typically not dictated and/or typically not recognized by a transcription system/ program. The e-shortcuts preferably allow the transcriptionist to make frequently-occurring edits in fewer keystrokes than without the shortcuts. For example, an e-shortcut may be performed by pressing one or two keys instead of, e.g., inserting a period, possibly deleting a comma, adding at least one space, and capitalizing an ensuing word by deleting its lead lower-case letter and inserting an upper-case letter. The e-shortcuts preferably balance the transcriptionist's need to edit quickly, and the need for accurate, cost-efficient editing. The initial list of e-shortcuts may be developed based on any of numerous factors, but preferably depends on at least the frequency with which a transcriptionist makes a particular formatting edit. In further preferred embodiments, the development and implementation of e-shortcut keys also depends on the speaker and/or the worktype of the document.

It has been discovered that several formatting (initial formatting, reformatting, removing formatting) procedures are frequently performed in medical transcription editing. In particular, Table 1 is a list of exemplary e-shortcut keystroke combinations discovered to be frequently used during such editing of a text document. E-shortcut key sequences are preferably available to the transcriptionist in tandem for each edited document. The e-shortcuts can work in tandem to perform simple or complex reformatting operations.

TABLE 1

| E-shortcut key sequence | Function Performed |
| --- | --- |
| Alt -.- | Inserts/removes sentence boundary formatting in the transcribed text, that is, inserts/removes a period at the end of the present word (at the next white space); inserts/removes an extra space (i.e., a "hard space") at the end of the present word; capitalizes/decapitalizes the word after the next white space in the transcribed text |
| Alt -,- | Inserts/removes a comma after the present word, then cursor jumps to the end of the next word |
| Alt -#- | Creates/removes an enumerated list out of a sentence |
| Alt -:- | Turns sequence of words into a Heading or into plain text |
| Alt -H- | Lists allowable section Headings for choice by transcriptionist |
| Alt -C- | Lists allowable contact names for choice by transcriptionist |

Figure 3A:
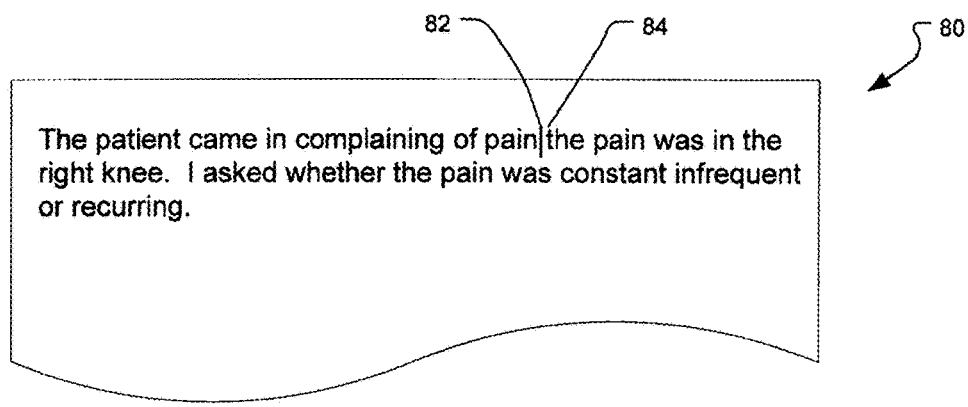
FIGS. 3A-3J are portions of a transcribed document showing editing functions.
Figure 3B:
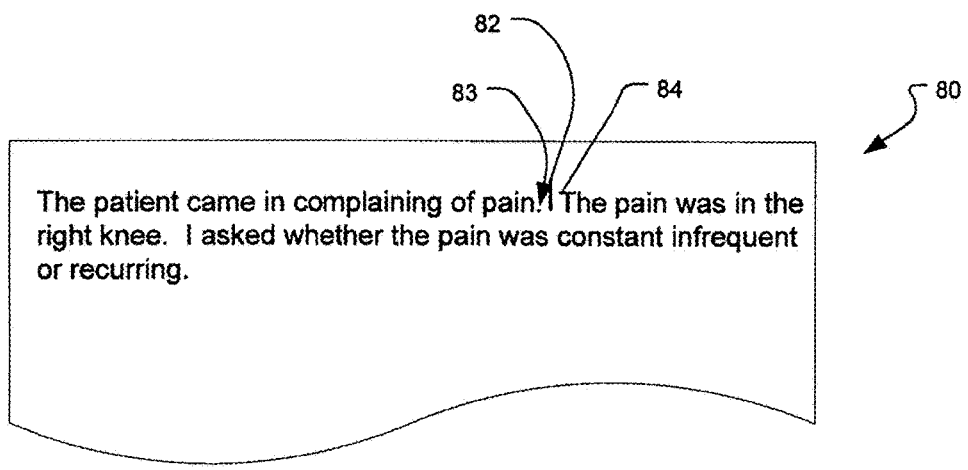

The 'Alt-.-' (i.e., press "Alt" and "." concurrently) or new/remove sentence e-shortcut is used to format a new sentence. Referring to FIG. 3A, a new sentence is inserted into a document 80 using the new/remove sentence e-shortcut, resulting in the document as shown in FIG. 3B. The new/remove sentence e-shortcut is activated to insert a period 83 at the end of the word at which the cursor 82 is positioned in FIG. 3A (at the next white-space to the right of the cursor's current position). An extra space is added after the period and the first letter 84 of the word following (to the right of) the period 83 is capitalized. Alternatively, the 'Alt-.-' e-shortcut can be used to remove the given sentence formatting (i.e., beginning with the document as in FIG. 3B and resulting with the document in FIG. 3A), based on an analysis of the current formatting. Where the word to the left of, or at, the cursor position ends in a period 83, actuating the new/remove sentence e-shortcut causes the period 83 to be removed, and any extra spaces (>1) after (to the right of) the period to be removed. The first letter 84 of the word to the right of the period 83 is made lowercase (i.e., initial capitalization is removed).

Figure 3C:
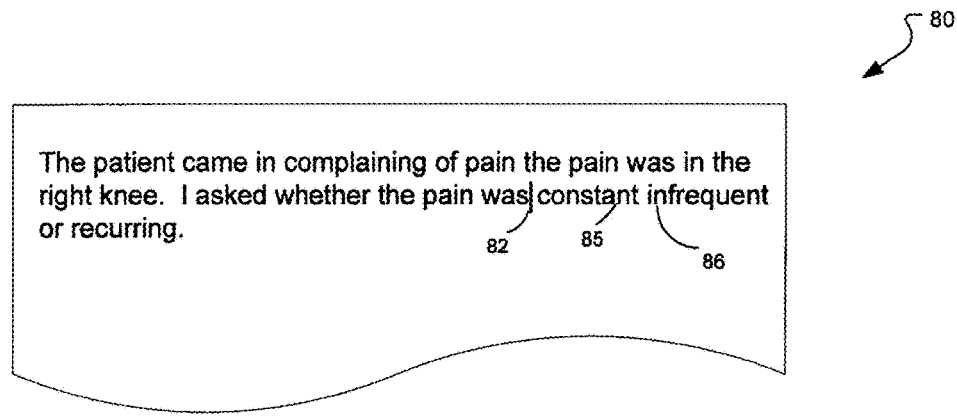
Figure 3D:
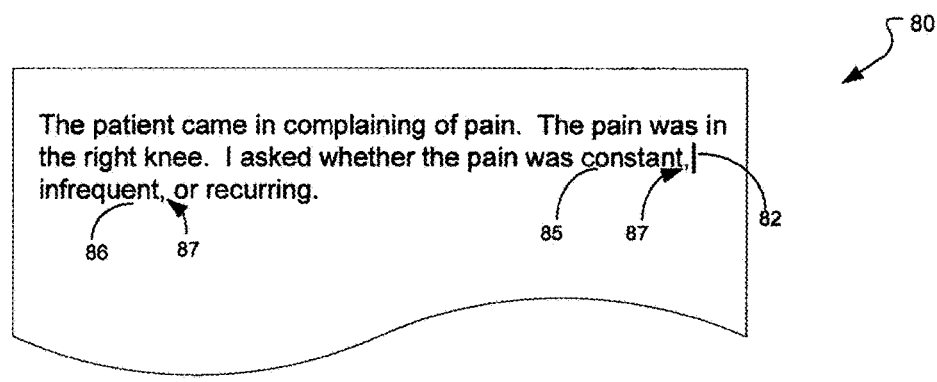

The 'Alt-,-' (i.e., press "Alt" and "," concurrently) or add/remove comma shortcut is used by the transcriptionist to insert a comma after the present word (i.e., the word in or next to which the cursor is positioned), and jump the cursor to the end of the next word. In FIG. 3C, the cursor 82 is positioned at a word 85. The add/remove comma e-shortcut is actuated and a comma 87 is inserted after the word 85, as shown in FIG. 3D. The cursor 82 jumps to a next word 86 in the series, and a comma 87 is inserted after the word 86 if the add/remove shortcut is invoked again. The add/remove comma e-shortcut can be actuated as many times as there are words in a sequence or list. A modifier key can perform the same operation for the next N white spaces, e.g. 'Alt-N-Alt', would be the same as hitting "Alt-,-" N times (e.g. five times) in a row, e.g., where there is a list of three (3) or more items to be separated by commas. The 'Alt-,-' shortcut key can be used to remove the given formatting, i.e., edit the document 80 from an initial text as in FIG. 3D to an edited text as in FIG. 3C. Where a word 85 at or to the left of the cursor 82 position ends in a comma 87, the comma 87 is removed, and the cursor 82 moves to the end of the next word 86 following the initial position of the removed comma.

Figure 3E:
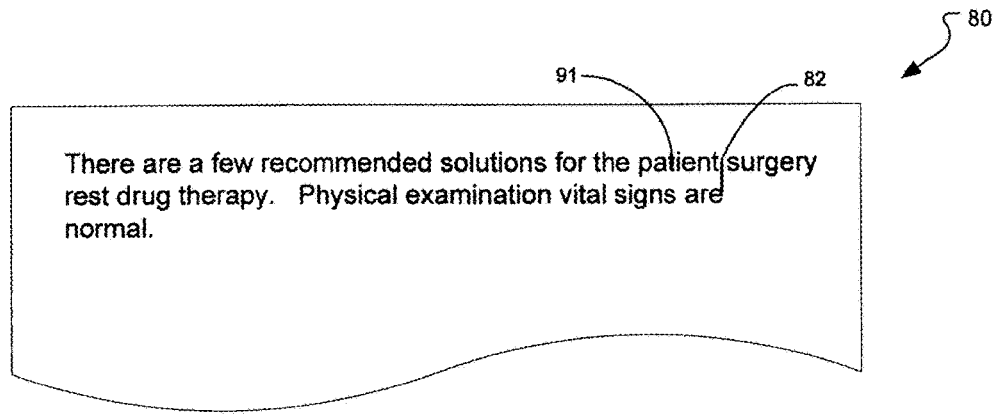
Figure 3F:
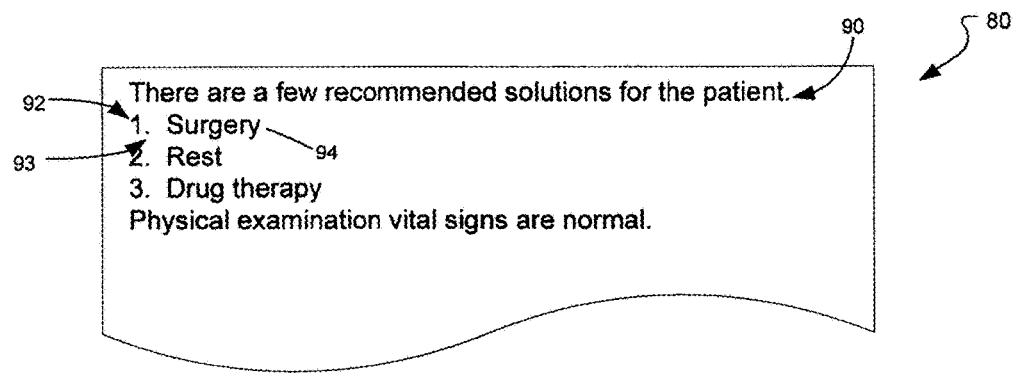

Referring to FIGS. 3E-3F, to alter a sentence so that it appears as an enumerated list item, a transcriptionist uses the 'Alt-#-' (i.e., press "Alt" and "#" concurrently) or add/remove list e-shortcut. Upon invoking the add/remove list e-shortcut in a document 80 shown in FIG. 3E, a period 90 is added to the end of a word 91 at which the cursor 82 is positioned, if a period is missing. If a comma is present at the end of the word at the cursor's location, the comma is replaced with a period 90. A line-feed (carriage return) is next inserted after the period 90. An arabic number 92 is inserted followed by a period 93 and two spaces. The next word 94 (to the right) is capitalized, if it is not already. The value of the arabic number 92 inserted depends on the first word in the preceding line. If that word (white-space delineated) is a number followed by a period, then the arabic number inserted is the next higher ordinal arabic number, otherwise it is '1'. The add/remove list e-shortcut can be actuated as many times as there are list items to enumerate. In this example, the add/remove list e-shortcut was used three times in the document 80 shown in FIG. 3E to achieve the appearance of the document 80 shown in FIG. 3F. A modifier may also be used with this e-shortcut to repeat the operation N times, similar to the modification discussed above with respect to the add/remove comma shortcut.

Enumerated list items are also removed using the e-shortcut 'Alt-#-'. If the line on which the cursor 82 is located begins with an enumerated list item, this function removes the number 92 and subsequent period 93, and removes the line feed prior to that item, so that the formerly enumerated line has been moved to the previous line (e.g., beginning with the document in FIG. 3F and resulting in the document as in FIG. 3E if this operation is invoked three times on each of the enumerated lines shown in FIG. 3F). The cursor 82 is moved to the beginning of the word 94 that was at the beginning of the formerly enumerated list item, so that other manipulations (e.g. Alt-.- or Alt-,-) can proceed. The values of subsequent enumerated list items are preferably modified/reduced by one (1).

Figure 3G:
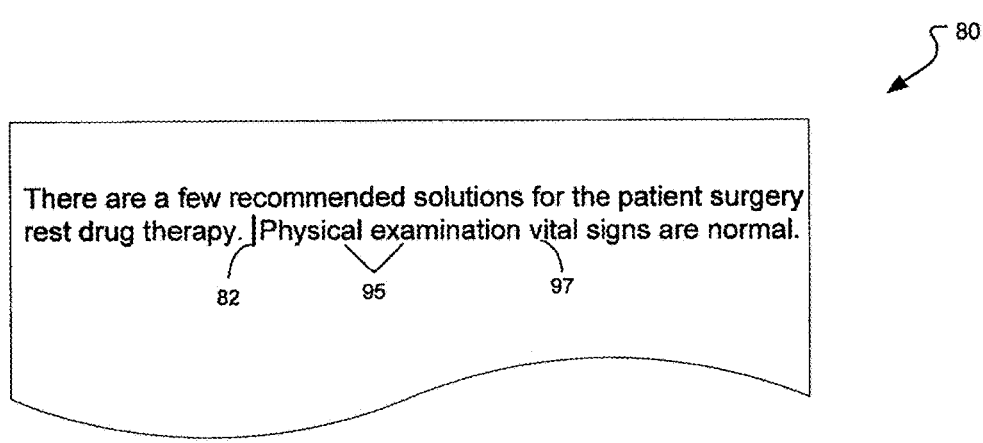
Figure 3H:
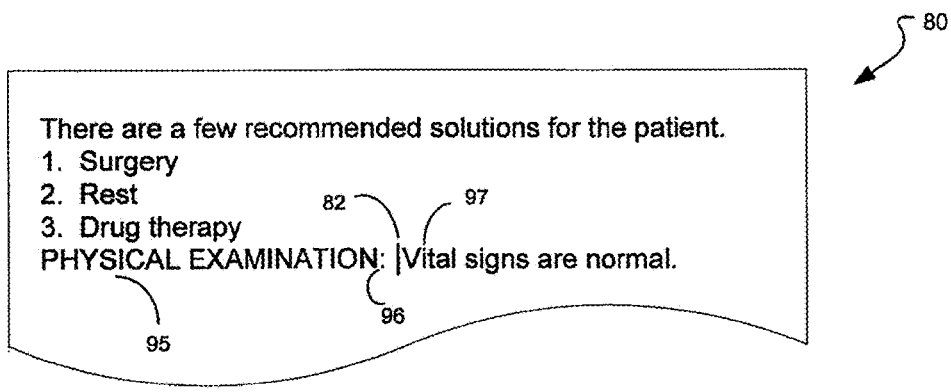

The transcriptionist uses the 'Alt-:-' (i.e., press "Alt" and ":" concurrently) or heading e-shortcut to turn a sequence of words into a heading. With reference to FIGS. 3G and 3H, if a word 95 at the present location of the cursor 82 is not at the beginning of the line, this function inserts a line-feed. Preferably, all the letters of the current word or words (if multiple words are highlighted or indicated, as discussed below) 95 are capitalized and a colon 96 is placed at the end of the capitalized word or words. If the word to the left of the cursor had a colon at the end, that colon is removed. The cursor moves to the beginning of an immediately subsequent word 97, two spaces are inserted before it (i.e., after the colon), and the first letter of the next word 97 is capitalized. Alternatively, a modifier key can be pressed to turn the next N words into a single section heading. For example, 'Alt-3 Alt-:-' (or 'Alt-:-3-', etc.) causes the next three words to appear as a section heading, with the colon at the end of the third word. Thus, using the heading e-shortcut, a sequence of words can be turned in a single multi-word heading.

The keystroke combination 'Alt-:-' may also be employed to remove headings (e.g., editing the document 80 as shown in FIG. 3H to appear as the document 80 as shown in FIG. 3G), If the word at the current cursor 82 position is all uppercased, but has no colon at the end, the word is changed to lowercase, unless it is at the beginning of the line or sentence, in which case the first character remains uppercased, and the cursor moves forward to the next word, so that 'Alt-:-' can be expeditiously invoked again. If the current word has a colon at the end of it, the colon is removed and, if the next word begins with an uppercased letter, this letter is changed to lower case, also removing any extra (>1) spaces before the next word. A numerical modifier may be used to affect multiple words similar to the discussions above.

Figure 3I:
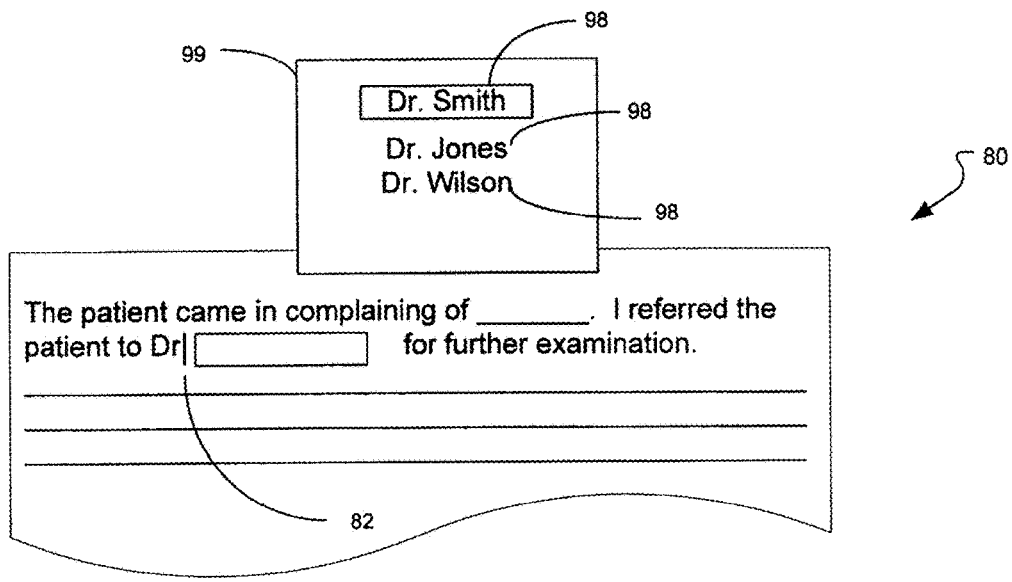
Figure 3J:
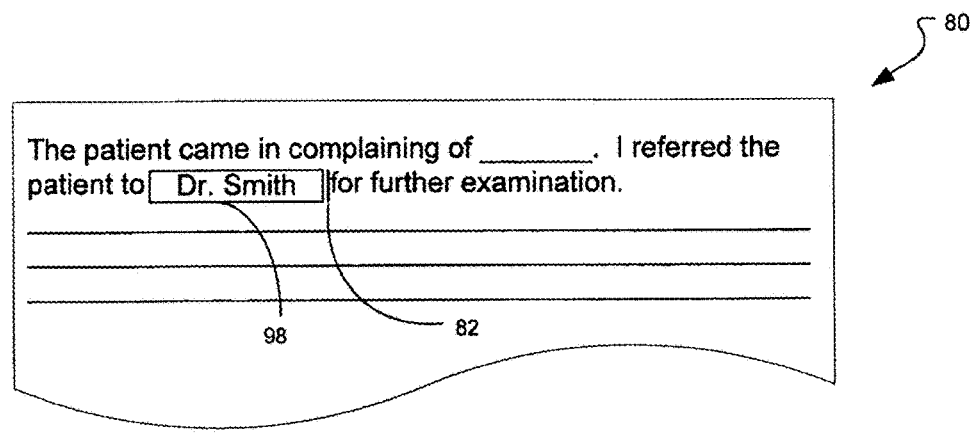

Referring to FIGS. 3I and 3J, e-shortcuts can be tailored for the insertion of speaker-specific and/or worktype-specific formatting elements in a medical transcription document 80. Examples of such formatting elements are section-headings and contact-names, which may be invoked using the 'Alt-H' (i.e., press "Alt" and "H" concurrently) and 'Alt-C' (i.e., press "Alt" and "C" concurrently) e-shortcuts, respectively, as listed in Table 1. For section headings and contact names, the database server 24 (FIG. 2) is used to associate with each document 80 a set of allowable entries 98 for the particular document type and speaker, with information associating entries 98, document type and speaker being stored in the database server 24. The document 80 is downloaded to the editing device 20, and the allowable entries 98 are also downloaded and become accessible to the editing program, via the predefined e-shortcut keys. When the relevant e-shortcut key is pressed, a menu 99 of the allowable items 98 appears, and the transcriptionist can select the particular item 98 desired, e.g., using a mouse-click or arrow keys and the enter key. The chosen item is inserted into the document 80 at the position of the cursor 82. A word or space currently at the position of the cursor 82 is replaced by the chosen item 98, and the menu 99 is hidden from view. The menu 99 reappears if the respective e-shortcut key is activated again in the document 80. The allowable items 98 can be, for example, contact-names or section headings.

Figure 4:
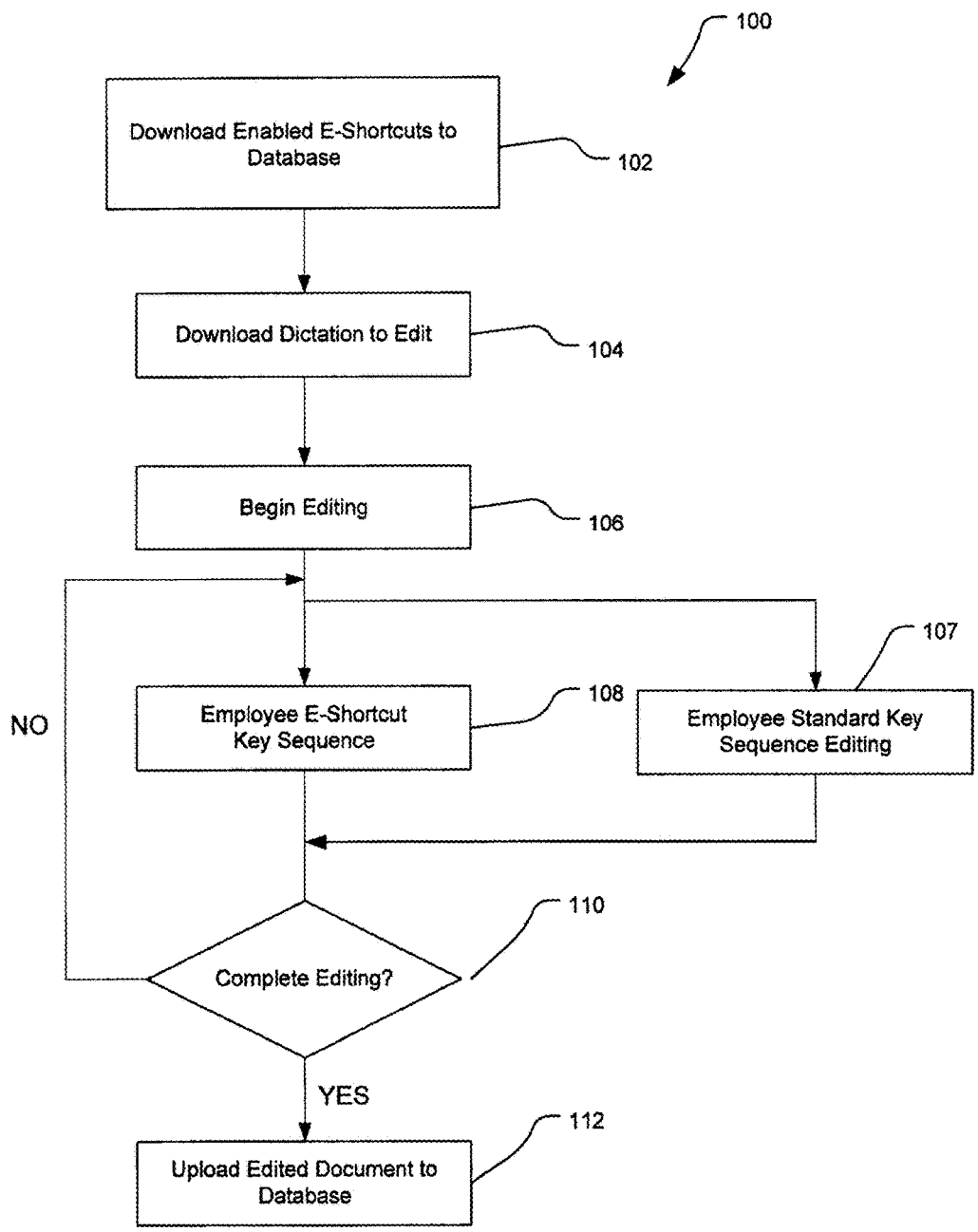
FIG. 4 is a block flow diagram of a process of using editing functions to edit transcription documents.

Referring to FIG. 4, and with further reference to FIG. 1 and FIG. 2, a process 100 of editing a document using standard editing keystrokes and/or the e-shortcut keys includes the stages shown. The process 100, however, is exemplary only and not limiting. The process 100 can be altered, e.g., by having stages added, removed, or rearranged. At stage 102, a set of enabled e-shortcuts is obtained. The enabled e-shortcuts can be obtained automatically by analysis of existing edited documents and repeated keystroke combinations. Analysis of existing edited documents can include analysis of the frequency (e.g., ratio relative to lines reviewed) at which keystroke combinations are used, and how the use of the keystroke combinations improves productivity.

At stage 104, the transcriptionist downloads a dictation for editing. Upon download, the transcriptionist can begin editing. At stage 106, the transcriptionist positions the cursor at a position for editing. At stage 107, standard (non-shortcut) keystrokes are used to edit the document as desired (e.g., using delete, carriage return, space bar, etc. keystrokes). From stage 107, the process 100 proceeds to stage 110 discussed below. Alternatively, at stage 108, an e-shortcut key sequence is employed for editing. During editing, the transcriptionist can select an e-shortcut when the cursor is positioned at a desired location in the text. The transcriptionist can choose the Alt-.-, Alt-,-, Alt-#-, or Alt-:- e-shortcuts depending on the correction to be made, e.g., to add/remove a paragraph, insert/remove a heading, create/remove a sentence, add/remove a list item, etc. Additional edits can be made without the use of the e-shortcuts. E-shortcuts can be used multiple times throughout the editing process.

At stage 110, the transcriptionist completes the edit using standard editing and/or e-shortcuts as appropriate, and the transcriptionist moves the cursor to the next editing position in the document. Upon completion of the editing process, at stage 112, the edited document is uploaded to the database, and the transcriptionist can choose another document for editing.

Figure 5:
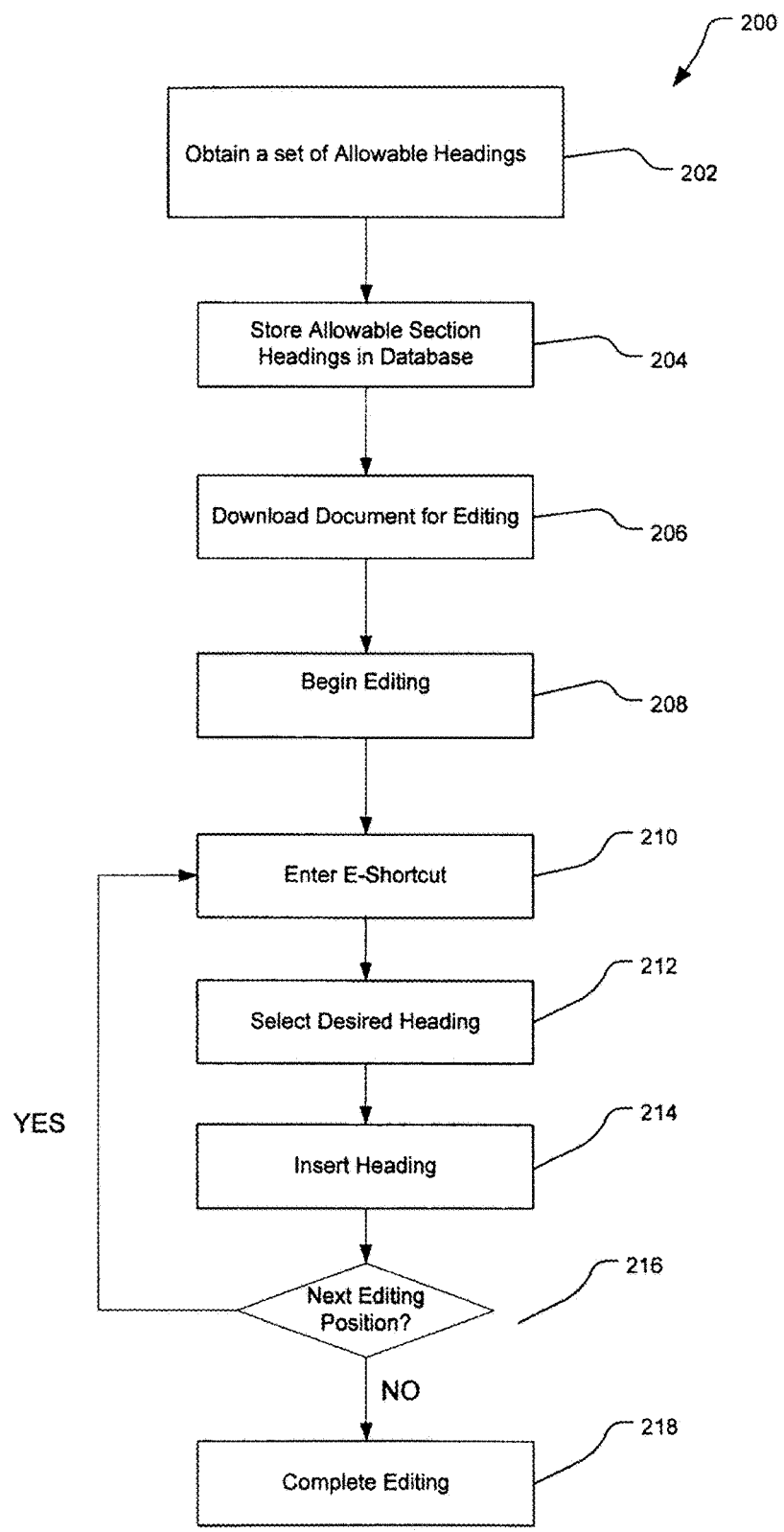
FIG. 5 is a block flow diagram of a process of using a heading editing function to edit transcription documents.

Referring to FIG. 5, and with further reference to FIG. 1 and FIG. 2, a process 200 of using the 'Alt-H' e-shortcut includes the stages shown. The process 200, however, is exemplary only and not limiting. The process 200 can be altered, e.g., by having stages added, removed, or rearranged. At stage 202, a set of allowable headings for a given worktype is obtained. The list of allowable section headings may be entered manually for example, and be based on the formatting requirements for an institution, or the list can be determined by analysis of existing medical records documents of the given worktype. The headings may be obtained in other manners as well.

At stage 204, the allowable section-headings lists are stored in the database server 24, keyed on the relevant worktype-identifier. Thus, worktype-identifiers and section headings lists are associated with each other so that, knowing the worktype, the corresponding list can be recalled for display. Preferably, a subset of approved section headings is stored for each speaker.

At stage 206, a transcriptionist downloads a dictation for editing. The editing device 20 also downloads the list of approved section-headings for the worktype (or speaker-worktype), which is stored in the database server 24 corresponding to the dictation. The transcriptionist begins editing at stage 208. While editing the document, actuation of the Alt-H e-shortcut-key at stage 210 causes a menu of the approved headings to pop up on the screen 52. At stage 212, the transcriptionist selects the desired heading, e.g., using the mouse 64 or arrow keys and the enter key (or other acceptable techniques).

At stage 214, if the heading is selected at stage 212 while the cursor is on a portion of the text that does not currently contain a section heading, or that contains an improper section heading, the selected heading is produced. If the transcription did not contain any heading at the location of the cursor, the selected heading is inserted at this location, followed by a colon and two spaces, and the next word is capitalized. If the transcription contained an erroneous heading at the location of the cursor, this heading is deleted (i.e., all of the capitalized letters surrounding the cursor), and the selected heading replaces this text. The colon is retained, as is the spacing between the heading and the word immediately after the heading and capitalization of this word.

At stage 216, the transcriptionist continues the editing process 200. The process 200 may return to stage 210 where an e-shortcut is employed again. Or, the process 200 may proceed to stage 218, where editing is completed, and the edited document is uploaded to the database server 24.

Figure 6:
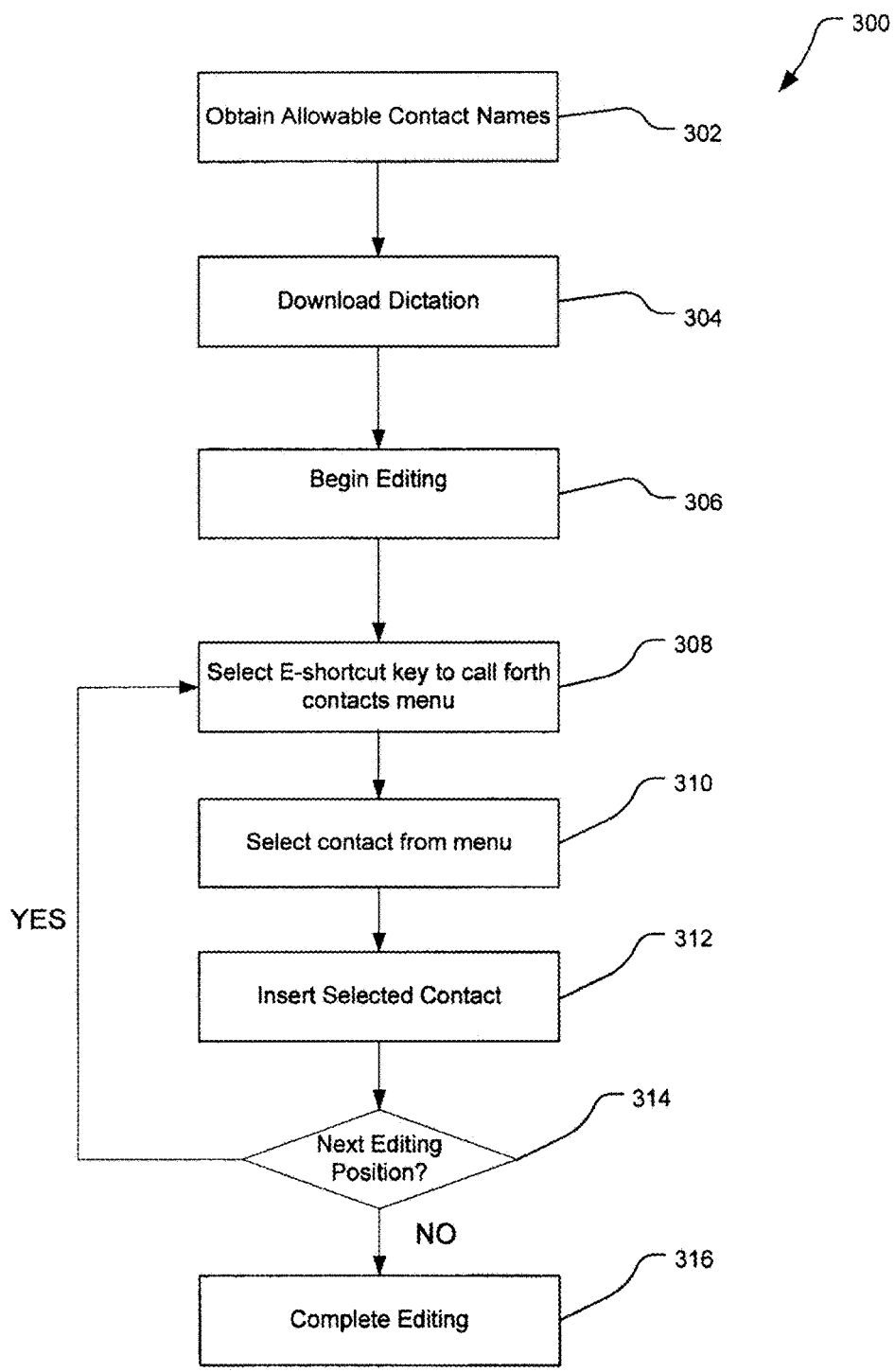
FIG. 6 is a block flow diagram of a process of using a contacts editing function to edit transcription documents.

Referring to FIG. 6 and with further reference to FIG. 1 and FIG. 2, a process 300 of using the 'Alt-C' e-shortcut includes the stages shown. The process 300, however, is exemplary only and not limiting. The process 300 can be altered, e.g., by having stages added, removed, or rearranged.

At stage 302, a set of allowable contact names for a given speaker is obtained. This list of allowable contact names may be entered manually, for example, and be based on the requirements for a speaker or for an entire institution. The list can be determined by analysis of existing medical records documents of the given worktype. The contact names may be obtained in other manners as well. This is done for each speaker on the system and the list of allowable contact names for each speaker is stored in the database server 24 keyed on the relevant speaker-identifier. Thus, worktype-identifiers and contact names lists are associated with each other so that, knowing the worktype, the corresponding list can be recalled for display. Preferably, a subset of approved contact names is stored for each speaker.

At stage 304, a transcriptionist downloads a dictation for editing, and at stage 306, the transcriptionist begins editing. The editing device 20 downloads the list of contact names for the speaker stored in the database server 24. At stage 308, the 'Alt-C' e-shortcut causes a menu of allowed contact names to pop up on the screen 52. At stage 310, the transcriptionist selects the desired contact name, e.g. using the mouse 64 or arrow keys and return key. At stage 312, the selected contact name is inserted into the document at the current location of the text cursor.

At stage 314, the transcriptionist continues the editing process 300. The process 300 may return to stage 310 where an e-shortcut is employed again. Or, the process 300 may proceed to stage 316, where editing is completed, and the edited document is uploaded to the database server 24.

Referring again to FIGS. 4-6, each of the processes 100, 200, 300 can be used in combination, such that after the download of a document for editing, and during editing of a single document, preferably any of the e-shortcut keys are available preferably throughout the editing of the document.

During an editing session, i.e., during any of the processes 100, 200, 300 of FIGS. 4-6, the use of the e-shortcut keys is monitored automatically by the editing device 20. This can be accomplished using generally available keystroke logging software, and filtering the software's output to include only the e-shortcut keystroke combinations, or by developing software that does so or that tracks only the usage of the e-shortcut keystroke combinations. A count of the number of times an e-shortcut is used is accumulated. By analyzing how the text was actually modified between the draft and the edited transcription, the number of times each keystroke combinations could have been used to modify the text is determined. An indicator, e.g., a ratio, is computed that expresses how often the transcriptionist uses e-shortcuts versus how often the transcriptionist could have used e-shortcuts. A ratio can be computed that expresses the comparison of e-shortcut usage to the lines of text edited. The monitoring process allows analysis of the frequency with which e-shortcut keys are used, individually or in collaboration. Data obtained from the monitoring process can be used to add, remove, or alter e-shortcuts to suit the transcriptionist during the editing process. For example, e-shortcut keys can be enabled and disabled. Further, performance can be monitored and reported to increase e-shortcut use, and improve productivity.

Figure 7:
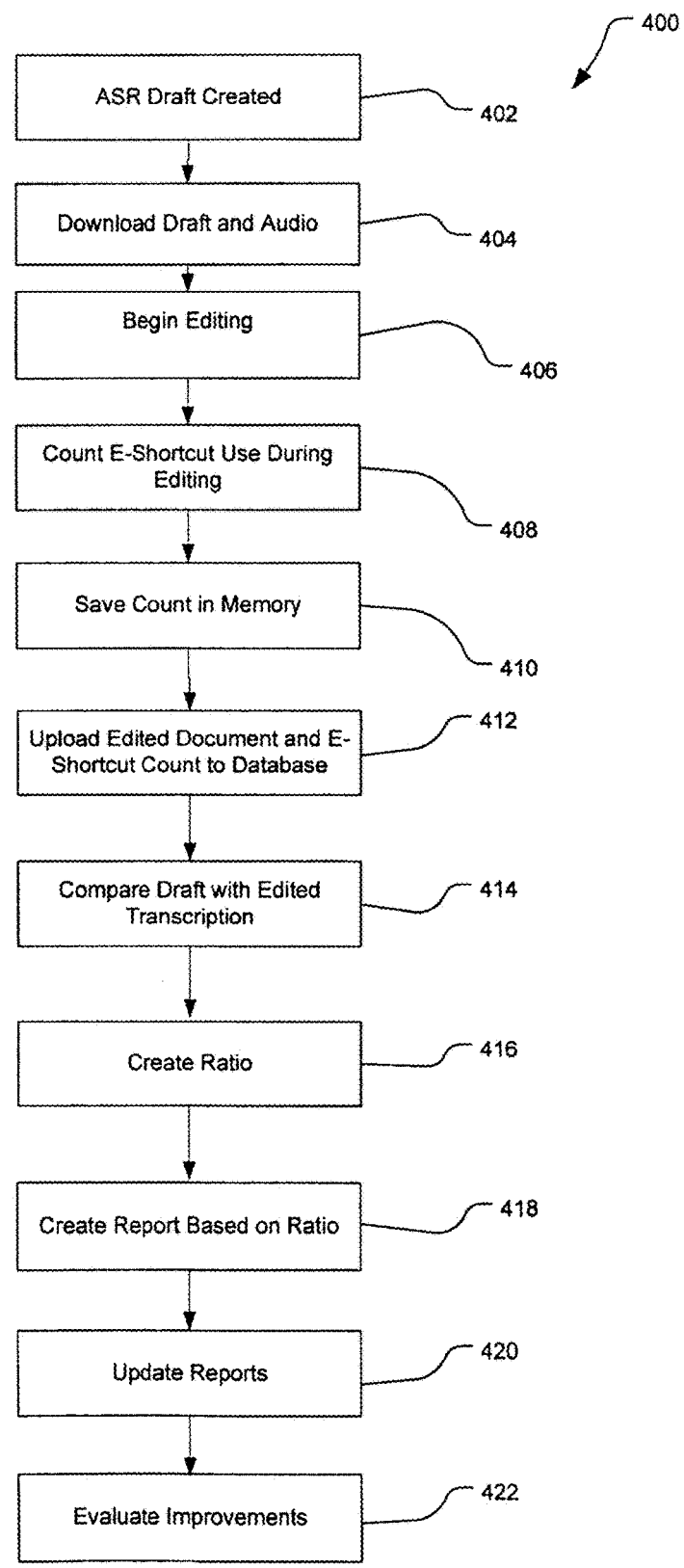
FIG. 7 is a block flow diagram of a process of monitoring, and applying knowledge of, use of editing functions.

Referring to FIG. 7 and with further reference to FIGS. 1-6, a process 400 of monitoring use of the e-shortcut keystroke combinations includes the stages shown. The process 400, however, is exemplary only and not limiting. The process 400 can be altered, e.g., by having stages added, removed, or rearranged.

At stage 402, an automatic speech recognition draft is created from the audio recording of a speaker. At stage 404, the transcriptionist downloads the draft and the audio. At stage 406, the transcriptionist begins editing the draft.

At stage 408, while editing, software monitors the usage of each of the e-shortcut keys by counting when each one is pressed. These counts are saved in memory at stage 410, one count for each e-shortcut key used. At stage 412 the edited transcription is uploaded into the database server 24, and the counts for each e-shortcut are also uploaded into the database server 24, using an identification key to associate the draft, the edited transcription and the key count. The database server 24 can also store the begin-time and end-time of the editing session for each dictation, along with an indicator of the inherent length of the dictation, e.g. total audio duration, number of "lines" of transcribed text in the edited document, number of words in the edited document, etc. Standard metrics for measuring productivity are computed, such as lines of edited text per hour of editing.

At stage 414, an offline process compares the draft with the edited transcription in order to identify modifications associated with e-shortcuts that could have been made using the e-shortcut keys. The process identifies: the number of textual locations where a period was added followed by upper-casing the first letter of the next word (or visa versa); the number of locations where more than one comma was added to a word sequence, or where more than one comma was deleted from a word sequence; the number of locations where an enumerated list item was added or removed; and the number of locations where plain text was turned into a section-heading or a section-heading was turned into plain text. Other editing functions can be identified.

At stage 416, for each of the textual modifications, a ratio between the number of times the relevant e-shortcut was used and the number of times it could have been used to make the modification is constructed. This ratio expresses how often a transcriptionist is using an e-shortcut when an e-shortcut is available to perform a formatting edit. Feedback is based on the ratios, and can include a count of the number of times a transcriptionist uses one particular e-shortcut, in comparison with the number of times the transcriptionist could have used the e-shortcut. Also, a determination of which e-shortcuts are being used by one or a number of transcriptionists and the increase in productivity for each of the respective transcriptionists can be expressed. Still further, a ratio of the line of text per hour of editing for a transcriptionist using e-shortcuts can indicate productivity increases.

Based on the ratio, at stage 418, a report is created summarizing the statistics over a number of documents per transcriptionist, including documents from dictations by a large number of speakers, worktypes, etc. The report can also include correlation statistics between the e-shortcut key usage and the productivity measure (e.g. lines of edited text per hour of editing). A report can be created for a transcriptionist organization to summarize how frequently a transcriptionist or an aggregate of some or all transcriptionists is using the e-shortcut keys.

At stage 420, the reports are updated at intervals, and changes in the usage of the e-shortcut keys are observed. Individual and/or aggregate reports can be provided to the transcriptionists or to the transcription supervisor to promote increased use of the e-shortcut keys to save transcription time.

At stage 422, the benefit in terms of improving editing productivity of each e-shortcut key is evaluated via a factor analysis. The dependent variable is the productivity measure and the independent variables are the usage rates for each of the e-shortcut keys. Thus, the effect of usage of particular shortcuts on productivity can be seen and used for feedback to influence transcriptionist action (e.g., increased shortcut usage) to improve productivity. The reports can be used to prioritize research topics for ASR technology. By observing which e-shortcut keys are used more often and which keys increase productivity, informed decisions are made about which formatting features are most desirable in the draft transcriptions. The ASR software can be improved to better incorporate the desired formatting to obviate editing to provide the formatting.

Additional functions can be monitored in the process 400. For example, navigational keys used to quickly move through a document to a place in the text that needs to be corrected can be monitored in addition to monitoring editing processes. This class of functions is especially relevant to editing drafts where all of the purported text is on the screen. In such a case, transcriptionists can often improve productivity by jumping to entirely different sections of the document than that which corresponds to the audio to which they are currently listening. Examples of these functions are the "ctrl-arrow" keys, which move the text cursor forward and backward by entire words instead of by characters, and the page-up and page-down keys, which move the text cursor up and down by a page of text. The usage of these functions can be monitored by the same mechanism as the editing e-shortcuts, as in FIG. 7. The effectiveness of the navigation around the document can be measured by constructing a ratio in which the number of e-shortcut navigation keystroke combinations used is compared to the number of total navigation keys used (i.e. just using the standard arrow keys). Transcriptionist productivity can be improved by increasing the ratio of e-shortcut navigation keys to standard navigation keys.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

In alternative embodiments, reports on e-shortcut use are based on the counts of the usage of each e-shortcut key rather than ratios. Reporting statistics can be accumulated over varied amounts of data (i.e., few or many edited documents). Enablement of e-shortcuts can vary depending on the reporting statistics on use and productivity.

Still further embodiments are within the scope and spirit of the invention. For example, the use of the particular keystroke combinations to implement the e-shortcuts can be any of a number of keystroke combinations. For example, in another embodiment, instead of Alt-.-, other characters could be used, including but not limited to ctrl-period, a specified function key, or a different key sequence. Keyboards can be manufactured with specific keys that perform these functions, or alternatively, the use of assigned function keys or other assigned keys on programmable keyboards can be utilized for e-shortcuts. Monitoring can occur over portions of the text document rather than a complete text document. Monitoring reports can be completed upon the evaluation of a number of completed editing sessions or a single editing session for a particular transcriptionist.

What is claimed is:

1. A method of editing text transcribed from audio information using a keystroke combination associated with both a first editing function and a second editing function different from the first editing function, the method comprising:
   performing content analysis of content in the text proximate a cursor, wherein:
   when a first content analysis result is determined, in response to performing the content analysis, performing the first editing function in response to completion of the keystroke combination to add at least one character to the text; and
   when a second content analysis result that is different from the first content analysis result is determined, in response to performing the content analysis, performing the second editing function in response to completion of the keystroke combination to remove at least one character from the text.

2. The method of claim 1, wherein the performing content analysis of content in the text proximate the cursor is performed in response to the completion of the keystroke combination.

3. The method of claim 1, further comprising transcribing the text from the audio information using automatic speech recognition.

4. The method of claim 1, wherein the first editing function comprises inserting sentence boundary formatting and wherein the second editing function comprises removing sentence boundary formatting.

5. The method of claim 1, wherein the first editing function comprises inserting a comma and wherein the second editing function comprises removing a comma.

6. The method of claim 1, wherein the first editing function comprises creating an enumerated list and wherein the second editing function comprises removing an enumerated list.

7. At least one article of manufacture, comprising:
   at least one non-transitory computer readable storage medium encoded with computer executable instructions which, when executed by at least one computer, cause performance of a method of editing text transcribed from audio information using a keystroke combination associated with both a first editing function and a second editing function different from the first editing function, the method comprising:
   performing content analysis of content in the text proximate a cursor, wherein:
   when a first content analysis result is determined, is response to performing the content analysis, performing the first editing function in response to completion of the keystroke combination to add at least one character to the text; and
   when a second content analysis result that is different from the first content analysis result is determined, in response to performing the content analysis, performing the second editing function in response to completion of the keystroke combination to remove at least one character from the text.

8. The at least one article of manufacture of claim 7, wherein the performing content analysis of content in the text proximate the cursor is performed in response to the completion of the keystroke combination.

9. The at least one article of manufacture of claim 7, wherein the method further comprises transcribing the text from the audio information using automatic speech recognition.

10. The at least one article of manufacture of claim 7, wherein the first editing function comprises inserting sentence boundary formatting and wherein the second editing function comprises removing sentence boundary formatting.

11. The at least one article of manufacture of claim 7, wherein the first editing function comprises inserting a comma and wherein the second editing function comprises removing a comma.

12. The at least one article of manufacture of claim 7, wherein the first editing function comprises creating an enumerated list and wherein the second editing function comprises removing an enumerated list.

13. A system for editing text transcribed from audio information using a keystroke combination associated with both a first editing function and a second editing function different from the first editing function, the system comprising:
an editing device comprising a processor configured to:
perform content analysis of content in the text proximate a cursor, wherein:
when a first content analysis result is determined, in response to performing the content analysis, the processor is further configured to perform the first editing function in response to completion of the keystroke combination by a user to add at least one character to the text; and
when a second content analysis result that is different from the first content analysis result is determined, in response to performing the content analysis, the processor is further configured to perform the second editing function in response to completion of the keystroke combination by the user to remove at least one character from the text.

14. The system of claim 13, wherein the editing device comprises a computer, the processor being part of the computer.

15. The system of claim 14, wherein the editing device further comprises a foot pedal coupled to the computer.

16. The system of claim 13, wherein the processor is configured to perform the content analysis of content in the text proximate the cursor in response to the completion of the keystroke combination.

17. The system of claim 13, further comprising a server coupled to the editing device to provide the text to the editing device.

18. The system of claim 17, wherein the server is coupled to the editing device via a network.

* * * * *